United States Patent [19]
Pavel

[11] Patent Number: 6,007,710
[45] Date of Patent: Dec. 28, 1999

[54] REVERSE OSMOSIS MEMBRANE HOUSING WITH INTEGRAL WIDE-AREA CHECK VALVE AND SHUT-OFF VALVE, OPTIONAL PRESSURE GAUGE, AND OPTIONAL LARGE-VOLUME HIGH-FLOW MEMBRANE CARTRIDGE

[76] Inventor: Augustin Pavel, 541 Industrial Way, Suite 1, Fallbrook, Calif. 92028

[21] Appl. No.: 08/937,854

[22] Filed: Sep. 25, 1997

[51] Int. Cl.⁶ .............................. B01D 61/10; B01D 61/12
[52] U.S. Cl. .......................... 210/90; 210/117; 210/136; 210/321.6; 210/446; 210/652; 220/203.01
[58] Field of Search ........................ 210/90, 110, 117, 210/134, 136, 257.2, 321.6, 418, 424, 443, 456, 497.01, 541, 652, 446–448; 220/202, 203.21, 203.02; 96/4

[56] References Cited

U.S. PATENT DOCUMENTS

| | | | |
|---|---|---|---|
| 4,695,375 | 9/1987 | Tyler | 210/117 |
| 4,808,302 | 2/1989 | Beall | 210/117 |
| 5,133,858 | 7/1992 | Walz et al. | 210/443 |
| 5,662,793 | 9/1997 | Beall | 210/90 |

*Primary Examiner*—Joseph W. Drodge
*Attorney, Agent, or Firm*—Fuess & Davidenas

[57] ABSTRACT

The cap to a reverse osmosis (R.O.) system membrane cartridge housing integrates both (i) a system automatic shut-off valve, and (ii) an improved check valve of such enlarged area and low pressure drop as typically gains 2–4 gallons per day in purified water output. The housing both reduces, typically from seven ports to five ports, and simplifies with hand-tightened quick fittings, the plumbing requirements of the R.O system. The housing fits a new and larger, typically 100+ gallon per hour, high-flow-rate R.O. membrane cartridge as well as myriad universal standard cartridges. A pressure gauge is optionally integrated.

4 Claims, 3 Drawing Sheets

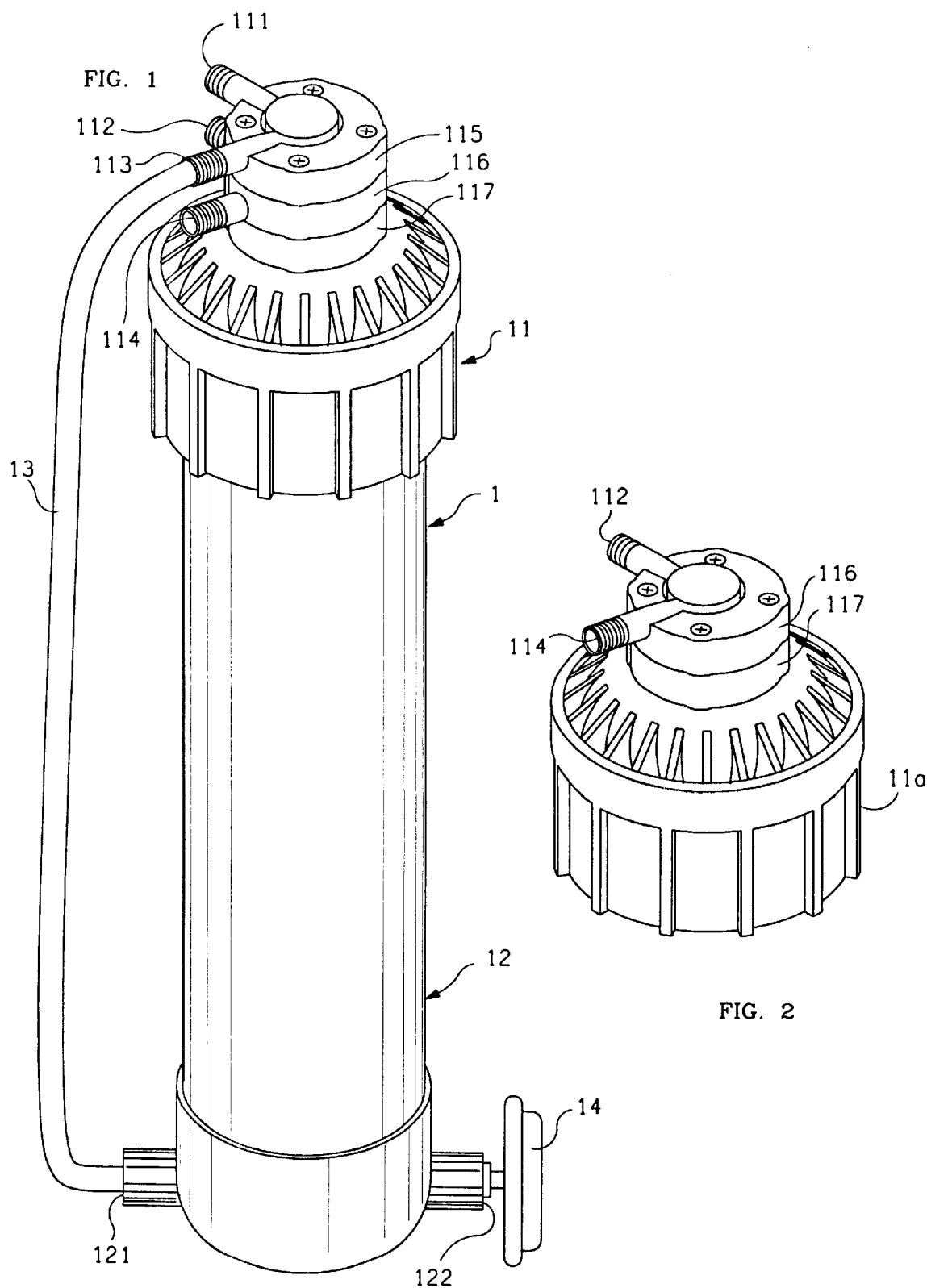

REVERSE OSMOSIS MEMBRANE HOUSING WITH INTEGRAL WIDE-AREA CHECK VALVE AND SHUT-OFF VALVE, OPTIONAL PRESSURE GAUGE, AND OPTIONAL LARGE-VOLUME HIGH-FLOW MEMBRANE CARTRIDGE

BACKGROUND OF THE INVENTION

1. Field of the Invention

The present invention generally concerns the (i) membrane housings, (ii) automatic shut-off valves, (iii) check valves, and (iv) reverse osmosis membrane cartridges, as are all within cartridge-type reverse osmosis systems that are primarily used in water purification.

The present invention particularly concerns improvements to a reverse osmosis membrane housing in order that it should integrally incorporate (i) both a check valve of a new, wide-area, construction and also a shut-off valve, and (ii) an optional pressure gauge, and in order that it should accommodate a new (iii) full-volume high-flow membrane cartridge, all the while that it is (iv) quickly and easily connected within a reverse osmosis system by a (net) reduced number of plumbed connections.

2. Description of the Prior Art 2.1 General Status of Prior Art Reverse Osmosis System Components, Specifically Including the Reverse Osmosis Membrane Housing The present invention will be seen to be embodied in a reverse osmosis membrane housing. Perhaps because these housings are presently (circa 1997) competitively produced by many sources—and have thus often been manufactured with such extreme economies of design, material and workmanship as have led to premature failure by bursting, and the subsequent demise of many manufacturers—the reverse osmosis industry has not heretofore shown much progress in perfecting this part. Although many dozens of different housing designs all accommodating the same universally-sized R.O. membrane cartridges exist and, indeed, have been collected for study by the inventor, these housings look, and function, very much the same. They are mostly simple cylindrical containers with screw caps that serve to house R.O. membrane cartridges, and to which plumbed connections may be made.

Meanwhile, another component of a reverse osmosis system—an automatic shut-off valve that prevents feed water from being fed to the R.O. membrane when no more product, purified, water is presently required (such as occurs, most commonly, when a storage tank of purified water is full)—has existed apart from the reverse osmosis membrane housing. The automatic shut-off valve requires four (4) plumbed connections.

Yet another valve—a check valve that prevents that the reverse osmosis membrane should be ruptured by an abnormal back-pressure in the product, purified, water line—has previously been incorporated within a reverse osmosis membrane housing.

Other R.O. system components—such as an occasional input line pressure gauge by which the correct operation or, alternatively, the failure, of the R.O. cartridge may be assessed—have also existed apart from the reverse osmosis membrane housing. They have required their own plumbed connections, normally two (2) such connections for an in-line pressure gauge.

Finally, because every manufacturer's R.O. membrane housing unit has needed to accommodate the vast supply of universal R.O. membrane cartridges having a standard form, it has been easy to push responsibility for the perpetually-desired higher purification rates onto the membrane manufacturers, and to ignore any possible complicity of the housing in limiting purification rates.

It is the premise of the present invention that major improvements can be realized in the reverse osmosis membrane housing of a reverse osmosis system. These improvements will be seen to concern (i) an higher degree of integration, reducing net plumbing requirements for the overall R.O. system (although plumbing requirements to the reverse osmosis membrane housing itself will be seen to be slightly increased), (ii) a new, larger, better-performing, check valve, (iii) accommodation of new and larger, high-flow-rate R.O. membrane cartridges in the same housing that otherwise fits universal standard cartridges, (iv) optional integration of useful gauges with the reverse osmosis membrane housing, and (v) easier, faster, hook-up.

2.1 Specific Prior Art Reverse Osmosis System Components, Including the Reverse Osmosis Membrane Housing The reverse osmosis membrane housing of the present invention will be seen to incorporate an automatic shut-off valve. A previous shut-off valve for an R.O. system—but not the reverse osmosis membrane housing of the system—that is based on the weight of the purified water is described in U.S. Pat. No. 3,939,074 to Bray for an APPARATUS FOR CONTROL OF A REVERSE OSMOSIS SYSTEM, assigned to Desalination Systems, Inc. (Escondido, Calif.). The Bray system concerns a reverse osmosis system having a tank for storing purified water and a valve in a pipe which introduces feed water into a module containing a semipermeable membrane that produces the purified water. The valve shuts off or turns on introduction of feed water into the module in response to the weight of purified water in the storage tank.

Another automatic valve is shown in U.S. Pat. No. 4,190,537 to Tondreau, et. al. for a WATER STORAGE CONTROL FOR REVERSE OSMOSIS SYSTEM, assigned to Desalination Systems, Inc. (Escondido, Calif.). Therein reverse osmosis system employs a tank for storing permeate under a pressure which is a portion of the pressure of feed water introduced into a pressure resistant container housing a semipermeable membrane cartridge. A control mechanism such as an automatic valve, preferably of the double diaphragm type, located in the line introducing feed water into the pressure resistant container closes to shut off feed water flow when the pressure in the permeate storage tank reaches a first predetermined value, less than the feed water pressure, and re-opens to re-establish feed water flow at a second predetermined pressure lower than the first or shut-off pressure. A constricted passageway device such as a venturi in the pipe or connection between a dispensing device such as a faucet and the permeate storage tank has its throat communicating with the sensing conduit for actuating the feed water control valve. When the dispensing faucet is opened, flow of permeate through the venturi creates an amplified and drastically reduced pressure in the sensing conduit, and applies a servo or magnified actuation force to the valve in the re-open end of its control range.

U.S. Pat. No. 4,705,625 to Hart, Jr. for a REVERSE OSMOSIS WATER PURIFYING SYSTEM concerns a reverse osmosis (R.O.) water purification system that collects and stores pure water at low pressure and dispenses it at high pressure. Impurities left behind when the water passes through a R.O. module are disposed of by two methods: the fast flush method and the slow flush method. In the fast flush method, water entering a R.O. module may take two paths to escape therefrom. The first path constrains it to travel through a semi-permeable membrane in the module which filters out undissolved solids and which restrains the passage of dissolved liquids. The second path allows it to travel through the R.O. module, without passing through the membrane, thereby carrying out those impurities left behind by the water passing through the membrane. The purified water is directed to one side of a compartmented storage tank and the waste water from the module is directed to a control valve. From the control valve, the waste water may be directed through a restriction to a drain or it may be directed to the other compartment of the storage tank where the purified water is held. In the slow flush method, water enters a control valve, travels to the R.O. module, and has two paths of escape therefrom. The first path constrains it to go through the semi-permeable membrane in the R.O. module, and through a check valve to storage or outlet. The second path allows the water to escape through the R.O. module, thereby carrying to a drain the impurities left behind.

U.S. Pat. No. 4,830,744 to Burrows for a REVERSE OSMOSIS ASSEMBLY OPERATING VALVE concerns a single control valve and associated conduits for operating a reverse osmosis assembly that includes a reverse osmosis cartridge, a reservoir that has a movable barrier therein that subdivides the interior into first and second confined spaces of variable volume, and a manually operated purified water dispensing valve, so that as the first confined space approaches a filled condition with purified water, the single control valve throttles the flow of pressurized feed water to the cartridge to minimize the use of feed water in the operation thereof, with the maximum backpressure to which purified water is subjected in discharging from the cartridge being that due to the weight of reject water in the second confined space, and a membrane in the reverse osmosis cartridge being fast-flushed with feed water to remove foreign material therefrom when the purified water dispensing valve is discharging purified water.

U.S. Pat. No. 4,834,873 for a COMBINED REVERSE OSMOSIS UNIT AND WATER INFLOW CONTROL VALVE FOR A WATER PURIFICATION SYSTEM to Burrows concerns an improved reverse osmosis unit for use in a water purification system. The reverse osmosis unit includes an integral control valve for regulating water inflow in response to system demand for purified water. The reverse osmosis unit includes a feed water inlet receiving a supply of ordinary tap water or the like for flow through a reverse osmosis cartridge having a membrane for separating the water inflow into a relatively pure water supply and a reject water supply with impurities concentrated therein. The pure water supply is coupled through a pure outlet port for collection within an appropriate storage vessel to await dispensing through a faucet valve or the like, whereas the reject water supply flows through a reject outlet port for discharge to a drain. When the storage vessel reaches a predetermined or substantially filled condition, the fluid pressure within the storage vessel acts against a control piston to displace the reverse osmosis cartridge and an integrated inflow control valve carried thereby toward a position closing or throttling the incoming feed water flow.

U.S. Pat. No. 4,876,002 to Marshall, et. al. for a REVERSE OSMOSIS WATER PURIFICATION UNIT, assigned to Schlumberger Industries, Inc. (Atlanta, Ga.), concerns a domestic reverse osmosis water purification system. Few parts in the controller valve mechanism reportedly enhance reliability and economic feasibility. All surfaces of the controller valve mechanism in contact with water are non-metallic and are constructed of FDA approved materials. In addition to its normal function of metering the reject water flow, the controller valve mechanism allows the homeowner to easily rinse the reverse osmosis membrane and conserves water by automatically stopping influent water flow when the product storage tank is full.

U.S. Pat. No. 5,002,668 for a HOUSING CONTAINING A PENETRABLE MEMBRANE SEALING AN EVACUATION OUTLET to Spranger, assigned to Gambro Dialysatoren GmbH & Co. KG (Federal Republic of Germany) concerns a diffusion and/or filtration apparatus. The apparatus includes a housing consisting of a cylindrical open-ended main part closed by two end caps and being provided with an inlet and outlet for a first fluid and at least one outlet for a second fluid having a penetrable membrane, said first fluid being adapted to flow through the fibers of a bundle of semipermeable hollow fibers arranged between two end walls within the housing and said second fluid being adapted to be removed from the space outside the fibers through said at least one outlet for the second fluid.

U.S. Pat. No. 5,503,735 to Vinas, et. al. for a MEMBRANE FILTRATION SYSTEM WITH CONTROL VALVES FOR OPTIMIZING FLOW RATES, assigned to Water Factory Systems (Irvine, Calif.), concerns a liquid purification system. In this system water is pumped into a filter cartridge. A reverse osmosis filter membrane in the filter cartridge removes impurities from the water, but not all of the water passes through the membrane. Water passing through the membrane exits the filter cartridge through a first outlet port, and is sent to a storage tank. Water not passing through the filter membrane exits the filter cartridge through a second outlet port. This water then passes through a pressure relief valve. The pressure relief valve can be adjusted to vary the water pressure and flow rates in the system. Some of the water exiting the pressure relief valve passes through a flow restrictor valve and then to drain. The flow restrictor maintains a constant flow rate at variable pressures. In this system, the flow restrictor is operable to maintain the same flow rate through it to drain and through the first filter outlet port. The match of these two flow rates results in a preferred 50% recovery rate of filtered water. Water that does not pass through the flow control restrictor is returned to the pump inlet for recycling through the system. An automatic flush system and various control functions for operation of the system are also discussed.

SUMMARY OF THE INVENTION

The present invention contemplates a new reverse osmosis membrane housing for a reverse osmosis system. The new housing (i) supports a higher degree of R.O. system components' integration, reducing net R.O. system plumbing requirements particularly by integrally incorporating a system shut-off valve, (ii) contains a new, larger, better-performing, system check valve, (iii) accommodates certain new and larger, high-flow-rate R.O. membrane cartridges as well as existing universal-standard cartridges, (iv) optionally integrates a useful gauge, and (v) permits easier and faster hook-up with hand-tightenable fittings.

1. A Combined Reverse Osmosis Membrane Cartridge Housing, Check Valve, and Automatic Shut-off Valve In accordance with the present invention, a reverse osmosis membrane housing includes both an elongate tubular body housing a reverse osmosis membrane cartridge, and a cap to the body at an end region thereof, where the cap integrally mounts both (i) a check valve, and (ii) an automatic shut-off valve.

The cap's check valve is flow-connected between a PRODUCT OUTLET portal and a central second-end region of the reverse osmosis membrane cartridge where appears (during reverse osmosis) product liquid. In this location it functions to prevent any such feedback of pressure from the PRODUCT OUTLET portal to the reverse osmosis membrane cartridge as might damage the cartridge.

Meanwhile, the cap's automatic shut-off valve has a moveable occluding element, as is typical of a valve. This element is moveable to selectively flow-connect a CAP MEMBRANE FEED portal to a FEED INLET portal, which portals are both on a first side of the moveable occluding element. Upon the other side of this element is sensed the pressure of product water from the central second-end region of the reverse osmosis membrane cartridge (the selfsame region and product water that is flow-connected to the check valve). Mind, the product water is not flow-connected to the automatic shut-off valve, nor to its moveable occluding element. However, the pressure of this product water is sensed by a simple mechanical connection, which mechanical connection is easy accomplished because the check valve (where appears the product water) is conveniently located alongside the shut-off valve. The automatic shut-off valve functions to selectively gate input liquid from the FEED INLET portal to the CAP MEMBRANE FEED portal only when the pressure of product water indicates that reverse osmosis should continue (in order to produce more product liquid).

A glimmering of the order of construction, which will be made increasingly clear upon reference to the drawings, is now possible. Both (i) the check valve and (ii) the automatic shutoff valve exist along side one another, and both within the cap of the reverse osmosis membrane housing. Although the function of each valve is conventional, the valves can be said to be plumbed synergistically, according a minimum of required plumbed connections to be made in a reverse osmosis system. Another way of saying essentially the same thing is to say that the layout of the two valves is "well thought out", both valves being jointly plumbed so as to work together cooperatively (although for their separate functions and purposes).

2. A Comprehensive Reverse Osmosis Membrane Cartridge Housing

In accordance with the present invention, a reverse osmosis membrane housing is constructed from (i) an elongate tubular body, (ii) a cap to the body, and (iii) a flow channel between the body and the cap.

The elongate tubular body has a cylindrical internal reservoir suitable to receive a cylindrical reverse osmosis membrane cartridge. The body has a first-end region with at least one BODY MEMBRANE FEED portal flow-communicating to a first-end of a reverse osmosis membrane cartridge, and a second-end region presenting screw threads. The flow-communication may be by an internal channel to the housing, but is typically by an external hose (which is quite short in accordance that it only goes from one end of the housing to the other).

A cap having threads serves to thread the second-end region of the elongate tubular body to mount the cap thereto, sealing pressure-tight the reservoir. The cap has (i) a WASTE OUTLET portal flow-connected to a second-end peripheral region of the reverse osmosis membrane cartridge where appears waste water during reverse osmosis, (ii) a check valve flow-connected between a PRODUCT OUTLET portal and a central second-end region of the reverse osmosis membrane cartridge where appears product liquid during reverse osmosis—the check valve functioning to prevent any such feedback of pressure from the PRODUCT OUTLET portal to the reverse osmosis membrane cartridge as might damage the cartridge—and (iii) an automatic shut-off valve having a moveable occluding element upon a one side of which element are flow-connected both a CAP MEMBRANE FEED portal and a FEED INLET portal—which two portals are correspondingly flow-connected to each other—and upon the other side of which element is sensed the pressure of product water from the central second-end region of the reverse osmosis membrane cartridge. The (iii) automatic shut off valve functions to selectively gate input liquid from the FEED INLET portal to the CAP MEMBRANE FEED portal only when said pressure of product water indicates that reverse osmosis should continue to produce product water.

Finally, the flow channel places the BODY MEMBRANE FEED portal in flow communication with the CAP MEMBRANE FEED portal.

The benefit of this construction, and this porting, is this: the number of plumbed connections as would normally be required to plumb (i) a reverse osmosis membrane housing and (ii) an automatic shut-off valve in a reverse osmosis system is reduced from seven (7) to five (5). (Indeed, the number of connections would be but three (3) if the necessary flow channel between the body and the cap was to be made internally during the screwed affixation of these elements, and without the external plumbing—the hose—typically used.)

3. An Improved Check Valve

In accordance with the present invention, a check valve—located in a substantially conventional position within a reverse osmosis membrane housing between (i) a central bore, through which bore is received product liquid during reverse osmosis, of a housing-contained cylindrical reverse osmosis membrane cartridge, and (ii) a portal to the housing through which portal is flow-communicated product liquid—is improved for including an occluding element—moveable as is typical on and off a valve seat—that is as large or larger in area than is the central bore. As such, the occluding element is very greatly larger than the occluding elements of prior art reverse osmosis system check valves, which have tended to be minute in accordance with (i) the minute flow rate of purified water through these valves, (ii) minimizing cost.

In the improved check valve of the present invention, a spring force biases the occluding element off the valve seat, permitting product liquid to flow from the central bore of the reverse osmosis membrane housing to the portal, unless the pressure at the portal exceeds a predetermined level as forces the occluding element onto the seat against the force biasing and precludes any flow of product liquid.

The purposes of the "large-area" check valve are three: 1) sensitivity, 2) reliability, and, most importantly, 3) reduced flow resistance. The "large-area" check valve is not only highly sensitive to pressure at the portal, and reliable in operation in accordance with its substantial parts, but it provides such a reduced restriction, and flow resistance, to the product water as will typically result in an additional 2–4 gallons of water being purified each day. The negative effect of a prior art check valve as a "bottleneck", albeit a small one, in a reverse osmosis system is not believed to have heretofore been recognized.

4. A Reverse Osmosis Membrane Cartridge Housing Improved for Receiving a High-Capacity Reverse Osmosis Membrane Cartridge In accordance with the present invention, both (i) the cylindrical reverse osmosis membrane cartridge, and (ii) the housing for containing the reverse osmosis membrane cartridge, of a reverse osmosis system are improved.

The new system is characterized in that certain new reverse osmosis membrane cartridges usable in the system are of a constant exterior diameter larger than heretofore, and are in no region increased by any external gasket or otherwise. Meanwhile, a fluid tight connection still has to be made within the cartridge housing to the now-gasketless exterior surface of these new larger-diameter reverse osmosis membrane cartridges. This is accomplished in that the new reverse osmosis membrane housing has a cylindrical central bore the interior diameter of which is substantially identical to the exterior diameter of the new reverse osmosis membrane cartridge, the bore constricting slightly at one end so as to make a good and fluid-tight connection between the cartridge and the housing regardless that the cartridge has no external gasket.

By this construction the new increased-diameter cylindrical reverse osmosis membrane cartridge occupies very substantially all the volume of the cylindrical central bore of the reverse osmosis membrane housing. It may typically have two to three (2–3) more turns (at maximum diameter) of the permeable membrane than did the largest R.O. cartridges heretofore, and a has a correspondingly higher water purification capacity, typically 100 gallons per hour and more. There is a slight disadvantage to the new cartridge-housing interface: the cartridges tend to stick in the housing. However, this can be easily overcome by grasping a spent cartridge with pliers and firmly pulling it out of the housing.

These and other aspects and attributes of the diverse aspects of the present invention will become increasingly clear upon reference to the following drawings and accompanying specification.

BRIEF DESCRIPTION OF THE DRAWINGS

FIG. 1 is a diagrammatic perspective view showing a preferred embodiment of a reverse osmosis membrane housing with integral wide-area check valve and shut-off valve, an optional pressure gauge, and an optional full-volume high-flow membrane cartridge, in accordance with the present invention.

FIG. 2 is a diagrammatic perspective view of a second embodiment of a cap of the reverse osmosis membrane housing shown in FIG. 1, the cap and housing embodiment incorporating the integral wide-area check valve but not a shut-off valve.

DESCRIPTION OF THE PREFERRED EMBODIMENT

1. General Geometry, and External Plumbing

Figure 3:
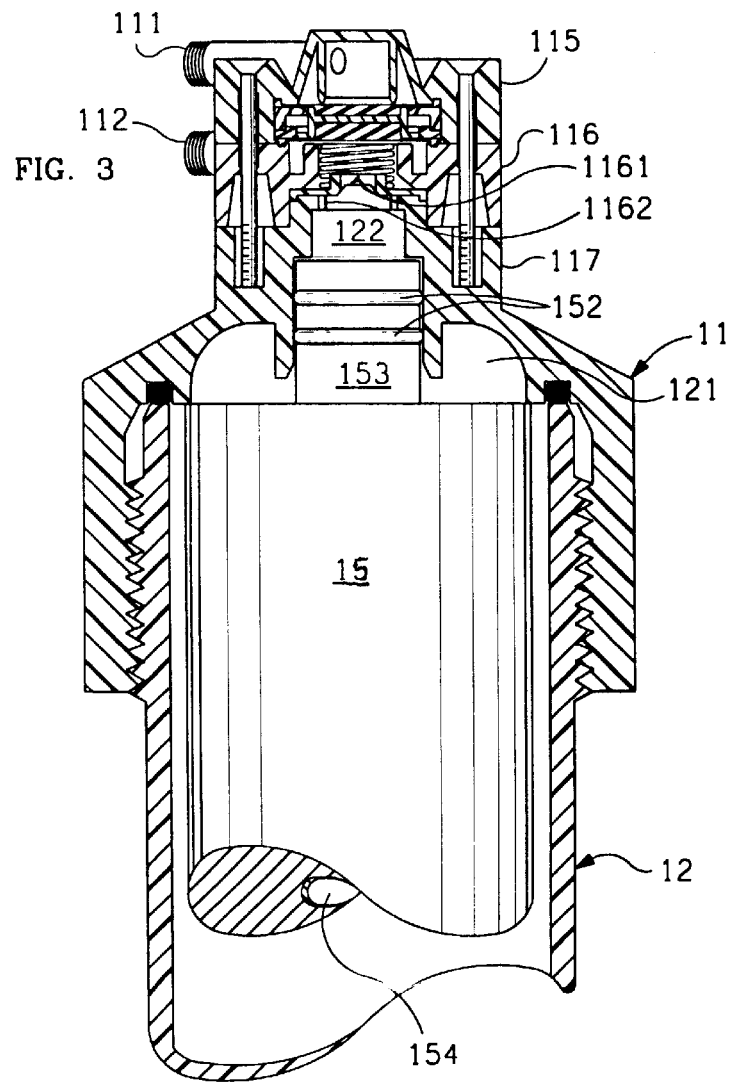
FIG. 3 is a cut-away side view of the top, including the cap, of the preferred embodiment of a reverse osmosis membrane housing previously seen in FIG. 1 minus (i) the optional pressure gauge, and (ii) the optional full-volume high-flow membrane cartridge (another, standard, cartridge being illustrated).

A diagrammatic perspective view of a preferred embodiment of a reverse osmosis membrane housing 1 in accordance with the present invention is shown in FIG. 1. Despite having the generally elongate generally cylindrical shape of all prior art reverse osmosis membrane housings that serve to fit those industry-standard cartridges that are also fitted by the membrane housing 1 of the present invention, the membrane housing 1 is immediately highly visually distinguishable for having (i) a large number of flow connection portals, illustrated to be four (4) portals 111–114 in a top cap 11 plus two (2) portals 121, 122 in a bottom cylindrical body 12, or six (6) total portals (as opposed to the typical three (3) portals); and (ii) a flow connection 13 between one portal (portal 113) in the cap 11 and another portal (portal 121) in the cylindrical body 12.

Figure 4:
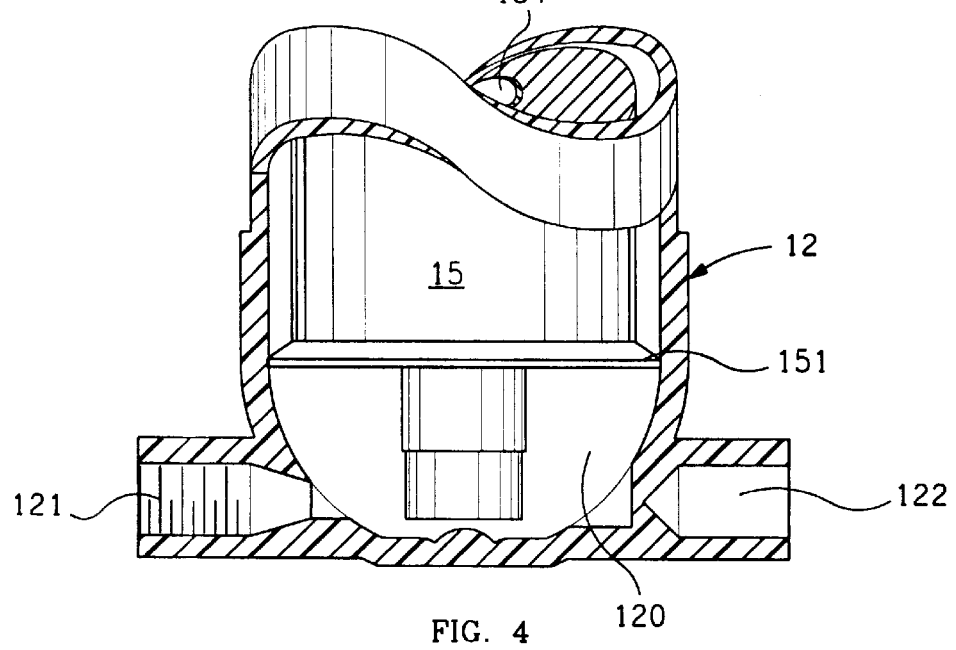
FIG. 4 is a cut-away side view of the bottom of the preferred embodiment of a reverse osmosis membrane housing previously seen in FIG. 1.

From top to bottom in FIG. 1, the cap 11 screws to the body 12 by large strong threads best visible in FIG. 3. The cap 11 detachably, but integrally, mounts an (optional) automatic shut-off valve 115 on top of a check valve 116 that is positioned upon a complimentary molded extended region 117 of the cap 11. Meanwhile, the body 12 is molded all in one piece. An optional pressure gauge 14 may be affixed by screwing into the portal 122 of the body 12, at which position it will be in flow communication with the bottom of a reservoir within the body 12, and at the end of a membrane cartridge 15 contained within the reservoir (which reservoir and membrane cartridge 15 are shown in FIG. 4).

Before explaining its internal workings, the general external plumbing of the reverse osmosis membrane housing 1 in accordance with the present invention will be described. Portal 111 in the cap 11 is called the FEED INLET portal, and is flow connected to an external source (not shown) of water or other liquid that is to be purified by process of reverse osmosis. This portal 111 is, as illustrated, flow communicating into the region described as the "automatic shut-off valve 115". It will latter be found that this automatic shut-off valve/region 115 has a moveable occluding element upon a one side of which element are flow-connected both (i) the FEED INLET portal 111 and (ii) the portal 113, which is called a CAP MEMBRANE FEED portal. The FEED INLET portal 111 is correspondingly flow connected to the CAP MEMBRANE FEED portal 113 at such times as the moveable occluding element of the automatic shut-off valve/ region 115 permits.

The CAP MEMBRANE FEED portal 113 is in turn flow connected through the flow connection 13, normally a hose as illustrated, to the portal 121 in the body 12. This portal 121 is called the BODY MEMBRANE FEED portal 121. It serves to flow communicate the water or other liquid (that is to be purified by process of reverse osmosis) from the external source (not shown) originally received at portal 111 of the cap 11 into the internal reservoir of the body 12, and more particularly into a bottom-end region of a reverse osmosis membrane cartridge 14 (shown in FIGS. 3 and 4) that is contained within the cylindrical body 12 of the housing 1.

It will be recalled that the portal 122 affixing the optional pressure gauge 14 is also in flow communication with this same region (i.e., the bottom of the reservoir within the body 12, and at the end of a membrane cartridge 15 contained within the reservoir). Accordingly, when the automatic shut-off valve/region 115 permits the flow of water (or other liquid) to be purified, some four (4) of the portals of the housing 1 are all in direct (i.e., without appreciable pressure drop) flow communication with each other: 1) FEED INLET portal 111, 2) CAP MEMBRANE FEED portal 113, 3) BODY MEMBRANE FEED portal 121, and 4) the portal 122 flow-connecting the optional pressure gauge 14.

Not surprisingly then, the remaining two (2) portals 112 and 114 are those conventionally associated with the final two (2) plumbed connections to a reverse osmosis membrane housing. A WASTE OUTLET portal 114 is flow-connected to a second-end peripheral region of the reverse osmosis membrane cartridge 15 (shown in FIGS. 3 and 4) where appears waste water during reverse osmosis. A PRODUCT OUTLET portal 112 is flow connected through a check valve in the region 116 to another, central (as opposed to peripheral), second-end region of the same reverse osmosis membrane cartridge 15 (shown in FIGS. 3 and 4) at which central region appears product (waste) liquid during reverse osmosis.

This internal plumbing may be more particularly observed in FIG. 3. The check valve of region 116 functions to prevent any such feedback of pressure from the PRODUCT OUTLET portal 114 to the reverse osmosis membrane cartridge 15 as might damage the cartridge.

A second embodiment cap 11a of the reverse osmosis membrane housing 1 is shown in diagrammatic perspective view in FIG. 2. The cap 11a integrally incorporates the wide-area check valve of region 116, but not the shut-off valve of region 115. A reverse osmosis system of which the membrane housing 1 forms a part still requires a shut-off valve; it is simply that when this shut-off valve is not incorporated within the cap 11 of the housing 1, then it is externally separately located and plumbed, as is conventional. A reverse osmosis membrane housing 1 having a second embodiment cap 11a is still distinct prior art membrane housings for, inter alia, (i) having a check valve of wide area, (ii) having an optional pressure gauge 14, and/or (iii) fitting an optional full-volume high-flow membrane cartridge 15a (shown in FIG. 5B).

The reverse osmosis membrane housing 1 is preferably made from polypropylene with 10% glass reinforcement, typically in an off-white color. So made it is approximately 30% lighter than 28% talc-filled polypropylene commonly used in the industry. The maximum temperature of use is 115° F.; the minimum temperature of use is 35° F., and the maximum pressure 130 p.s.i. The maximum core tube length is 11¾", and all standard HRO membrane elements to 2" diameter are accommodated. The overall length is approximately 13", and the major external diameter 2.45". Al five ports are size ¼" standard tubing, and have hand-tightenable screw fittings built in.

The housing 1 can optionally be delivered into service with, or without, each of its (i) shut-off valve of region 115 and/or its (ii) pressure gauge 14.

2. Internal Structure, and Internal Plumbing

A cut-away side view of the top of the preferred embodiment of a reverse osmosis membrane housing 1 previously seen in FIG. 1, including the cap 11, is shown in FIG. 3. A cut-away side view of the bottom of the same preferred embodiment of a reverse osmosis membrane housing 1, now minus its optional pressure gauge 14 previously seen in FIG. 1, is shown in FIG. 4. An illustrated exemplary standard, prior art, membrane cartridge 15 shown contained within the housing 1 is neither a part of the housing 1 nor the present invention.

In accordance with the normal and conventional function of a reverse osmosis membrane cartridge 15 (as is contained within a housing), unpurified water or other liquid that is entered into pressurized contact with the cartridge at one of its butt ends is separated into (i) purified water exiting from the central bore at the other end of the cartridge and, separately (ii) waste, or product, water at the outside of the cartridge, and at peripheral (i.e., not at the central bore) regions of this other end. A seal 151 prevents that unpurified water entered into a lower chamber 120 of the cylindrical body 12 through its BODY MEMBRANE FEED portal 121, and thus coming in contact with the lower end (as illustrated) of cartridge 15, should come into contact with the waste, or product, water present at the outside of cartridge 15, and in the upper chamber 121. Likewise, seals 152 about the bore extension 153 prevent that purified water present in the bore extension 153 should come in contact with this waste, or product, water present at the outside of cartridge 15, and in the upper chamber 121. As is necessitated by the function of the cartridge 15, its central bore 154 is occluded (occlusion not shown), and is not flow-communicating from one end of the cartridge to the other even though this bore is commonly hollow to save weight and material.

More importantly to the present invention than is the conventional location, and function, of the prior art reverse osmosis membrane cartridge 15 is the extensive, synergistic, structure and functionality of the preferably two (2) valves present in the cap 11.

The lowermost valve as illustrated in the lower region 116 of the cap 11 (immediately above the preferred molded extended region 117) is a check valve. It is thus called a "valve/region 116". This check valve/region 116 functions, as previously explained, to prevent any such feedback of pressure from the PRODUCT OUTLET portal 112 to the reverse osmosis membrane cartridge 15 as might damage the cartridge. In other words the check valve/region 116 functions as a pressure relief in the purified water appearing at the PRODUCT OUTLET portal 112, dumping this purified water (as appears at and in cavity 122) into the WASTE OUTLET portal 114 (shown in FIG. 1) when the pressure exceeds a preset limit.

Notably, this check valve 116 is of an unique construction. It has a moveable occluding element 1161, moveable on and off a valve seat 1162, that is as large or larger in area than is the central bore 154 of the cartridge 15. A spring (not labeled, shown as a coil above occluding element 1161) force biases the occluding element 1161 off its seat 1162, permitting product liquid to flow from the upper region of central bore 154 of the reverse osmosis membrane 15, and from the cavity 122, to the PRODUCT OUTLET portal 112 unless the pressure at this portal exceeds the predetermined level, forcing the occluding element 1161 onto the seat 1162 against the force of spring (not labeled) and precluding any flow of product liquid.

The moveable occluding element 1161 of the "large-area" check valve is typically made of flexible plastic, or neoprene rubber. It is not only highly sensitive to pressure at the portal because of its large area, and reliable in operation because of its adequate size and mass, but it provides such a reduced restriction, and flow resistance, to the product water as will typically result in an additional 2–4 gallons of water being purified each day.

Continuing in FIG. 3, an automatic shut-off valve 115 is present at the top (as illustrated) of the cap 11. This valve 115 again has a moveable occluding element 1151 upon a one side of which element are flow-connected both the FEED INLET portal 111 and the CAP MEMBRANE FEED portal 113 (shown in FIG. 1). The FEED INLET portal 111 is normally flow connected to the CAP MEMBRANE FEED portal 113, the moveable occluding element 1151 of the automatic shut-off valve 115 being of positioned where it does not occlude this flow. Notably, the pressure of product water from the upper region of the central bore 154 of the reverse osmosis membrane cartridge 15 is mechanically transmitted to one, the bottom, side of the moveable occluding element 1151. Should this pressure of the product water rise above a predetermined level—as might normally, typically and routinely indicate only that a reservoir, or tank, storing purified product water was full—then this moveable occluding element 1151 of the automatic shut off valve 115 will function to block input liquid from the FEED INLET portal to the CAP MEMBRANE FEED portal, thus suspending the any continuation of reverse osmosis to produce product water.

This is, of course, the normal function of an automatic shut-off valve within a reverse osmosis system. It will simply be noted that, within the reverse osmosis membrane cartridge housing 1 of the present invention, the automatic shut-off valve 115 is integrated with the housing 1 (particularly in its removable cap 11), and is, further, synergistic in sensing the pressure of product water appearing at a co-located check valve.

3. Improvements to the Reverse Osmosis Membrane Cartridge Housing Permitting Fitting of a New High-Capacity Reverse Osmosis Membrane Cartridge Still further in accordance with the present invention, the same reverse osmosis membrane cartridge housing 1 shown in FIGS. 1, 3 and 4 is subtlety altered so as to accommodate a new, larger, higher capacity, reverse osmosis membrane cartridge.

Figure 5A:
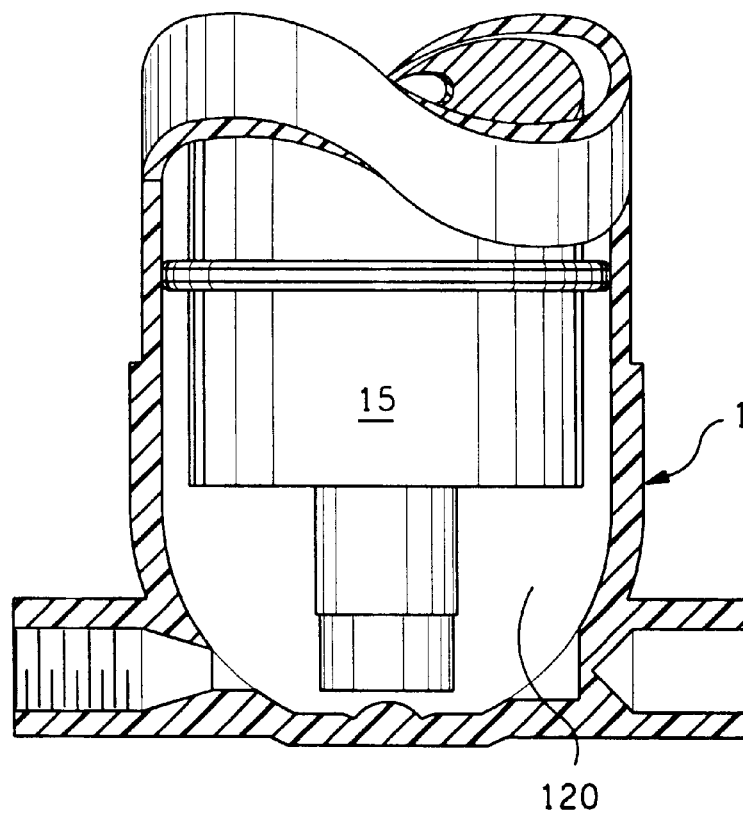
FIG. 5A is a cut-away side view of a prior art membrane cartridge within the preferred embodiment of a reverse osmosis membrane housing in accordance with the present invention.
Figure 5B:
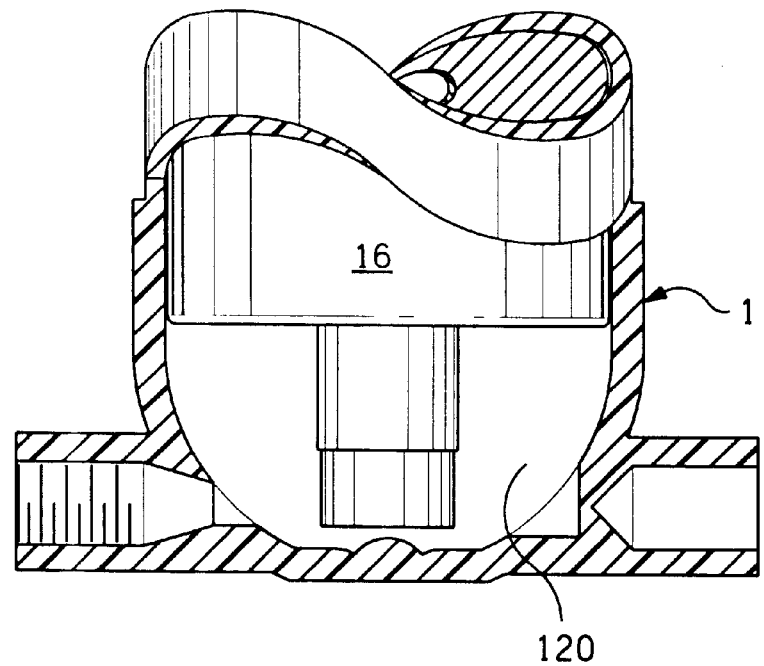
FIG. 5B is a cut-away side view of a full-volume high-flow membrane cartridge in accordance with the present invention inside a reverse osmosis membrane housing in accordance with the present invention.

A cut-away side view of showing the prior art membrane cartridge 15 within the preferred embodiment of a reverse osmosis membrane housing 1 in accordance with the present invention is shown in FIG. 5A. A cut-away side view of a new, larger, full-volume high-flow membrane cartridge 16 in the same housing 1 is shown in FIG. 5B.

Clearly the new reverse osmosis membrane cartridge 16 is of a higher is of a greater exterior diameter. This exterior diameter is constant, and is in no region increased by any external gasket or otherwise. In other words, the new cartridge 16 has no external gasket 151 (shown in FIG. 4), and is to that extent distinguished from all other prior art cartridges. The thing that makes use of such a cartridge possible is, however, that the reverse osmosis membrane housing has a cylindrical central bore the interior diameter of which is substantially the same as the exterior diameter of the new reverse osmosis membrane cartridge 16 while tapering and constricting but slightly at one (the bottom) end. This constriction serves to make a fluid-tight connection between the (undifferentiated) outside of the large-diameter membrane cartridge 16 and the interior of the housing 1 regardless that the cartridge 16 has no external gasket.

Clearly the new cylindrical reverse osmosis membrane cartridge 16 occupies very nearly all the volume of the cylindrical central bore of the reverse osmosis membrane housing 1. It may typically accommodate two to three (2–3) more turns (at high diameter) of the permeable membrane than the largest of the previous reverse osmosis membrane cartridges (of the universal types suitable for use in the housing 1). The larger cartridge 16 has a correspondingly higher water purification capacity, typically some 100 gallons per hour and more in a normal (pressure and size) reverse osmosis system.

In accordance with the preceding explanation, variations and adaptations of the any of (i) reverse osmosis membrane cartridge housings, (ii) reverse osmosis system check valves, (iii) reverse osmosis system check and shut-off valves jointly located in a reverse osmosis membrane cartridge housing, and/or (iv) large-diameter cylindrical reverse osmosis membrane cartridges complimentary to reverse osmosis membrane cartridge housings, in accordance with the present invention will suggest themselves to a practitioner of the art of reverse osmosis system, and reverse osmosis system component, design. For example, still further gauges and/or valves may be integrated. For example, even the slight volume 120 may be used by yet a further expansion of the reverse osmosis membrane cartridge 15/16 into this region. What the present invention generally teaches is that the housing for a reverse osmosis membrane cartridge within a reverse osmosis system should not be regarded simply as a simple reservoir, but should be considered to be a component of the reverse osmosis system quite logically, and beneficially, subject to optimization as is any other system component.

In accordance with these and other possible variations and adaptations of the present invention, the scope of the invention should be determined in accordance with the following claims, only, and not solely in accordance with that embodiment within which the invention has been taught.

What is claimed is:

1. A reverse osmosis membrane housing comprising:
   an elongate tubular body housing a reverse osmosis membrane cartridge; and
   a removable cap to the body at an end region thereof integrally mounting in and of itself:
      a check valve flow-connected between a product outlet portal and a central second-end region of the reverse osmosis membrane cartridge where appears product liquid during reverse osmosis, the check valve functioning to prevent any feedback of pressure from the product outlet portal to the reverse osmosis membrane cartridge as might damage the cartridge; and
      an automatic shut-off valve;
   wherein the automatic shut-off valve has a moveable occluding element upon a one side of which element are flow-connected both a cap membrane feed portal and a feed inlet portal, which two portals are correspondingly flow-connected to each other, and upon the other side of which element is sensed the pressure of product water from the same central second-end region of the reverse osmosis membrane cartridge that is flow-connected to the check valve, the automatic shut off valve functioning to selectively gate input liquid from the feed inlet portal to the cap membrane feed portal only when said pressure of product water indicates that reverse osmosis should continue to produce product water.

2. The reverse osmosis membrane housing according to claim 1
   wherein flow communication of input liquid transpires from at least one first portal, called a membrane feed portal, to both (i) a end region of a reverse osmosis membrane cartridge contained within the housing which end region is oppositely situated to the end region where is the cap, and (ii) a one side of the automatic shut-off valve;
   wherein flow communication of waste liquid transpires between a second portal, called a waste outlet portal, and a peripheral portion of that end region of the reverse osmosis membrane cartridge that is proximate to the cap; and
   wherein flow communication of product liquid transpires between a portal, called a product outlet portal, and both (i) a one side of the check valve and (ii) a central portion of that end region of the reverse osmosis membrane cartridge that is proximate to the cap.

3. A reverse osmosis membrane housing comprising:
   an elongate tubular body having a cylindrical internal reservoir suitable to receive a cylindrical reverse osmosis membrane cartridge, the body having a first-end region with at least one body membrane feed portal flow-communicating to a first-end of a reverse osmosis membrane cartridge, and a second-end region presenting screw threads;

a cap having threads for threading the second-end region of the elongate tubular body to mount the cap thereto sealing pressure-tight the reservoir, the cap having and containing completely within itself:

a waste outlet portal flow-connected to a second-end peripheral region of the reverse osmosis membrane cartridge where appears waste water during reverse osmosis; and a check valve flow-connected between a product outlet portal and a central second-end region of the reverse osmosis membrane cartridge where appears product liquid during reverse osmosis, the check valve functioning to prevent any feedback of pressure from the product outlet-portal to the reverse osmosis membrane cartridge as might damage the cartridge; and an automatic shut-off valve having a moveable occluding element upon a one side of which element are flow-connected both a cap membrane feed portal and a feed inlet portal, which two portals are correspondingly flow-connected to each other, and upon the other side of which element is sensed the pressure of product water from the central second-end region of the reverse osmosis membrane cartridge, the automatic shut off valve functioning to selectively gate input liquid from the feed inlet portal to the cap membrane feed portal only when said pressure of product water indicates that reverse osmosis should continue to produce product water; and a flow channel placing the body membrane feed portal in flow communication with the cap membrane feed portal.

4. A reverse osmosis membrane housing comprising:

an elongate tubular body housing a reverse osmosis membrane cartridge; and a cap to the body at an end region thereof integrally mounting:
a check valve, and
an automatic shut-off valve;

wherein, because of the integration of the check valve and the automatic shut-off valve in the cap to the elongate tubular body, the combined cap and body have and present at least five externally-accessible plumbed portals consisting of:

a body membrane feed portal flow-communicating with a first-end region of a reverse osmosis membrane cartridge, a waste outlet portal flow-communicating to a second-end peripheral region of the reverse osmosis membrane cartridge; and a product outlet portal flow-communicating to a first side of a check valve the remaining side of which is flow-communicating to a central second-end region of the reverse osmosis membrane cartridge, and a cap membrane feed portal and a FEED INLET portal that are flow-connected to each other and to a one side of an occluding element of an automatic shut-off valve the remaining side of which element is sensed a pressure of product water from the central second-end region of the reverse osmosis membrane cartridge;

wherein the body membrane feed portal is flow-connected to the cap membrane feed portal.

* * * * *